United States Patent
Wright

[11] 3,802,781
[45] Apr. 9, 1974

[54] EXTENSOMETERS

[76] Inventor: David Charles Wright, 7 The Meadows, Shawbury, England

[22] Filed: Aug. 15, 1972

[21] Appl. No.: 280,908

[52] U.S. Cl............ 356/169, 33/125 C, 33/147 D, 73/88 A
[51] Int. Cl. .......................................... G01b 11/16
[58] Field of Search ........ 356/156, 169; 250/237 G; 73/88 A; 33/147 D

[56] References Cited
UNITED STATES PATENTS
2,787,834   4/1957   Shoup............................... 356/169

FOREIGN PATENTS OR APPLICATIONS
971,504   2/1961   Great Britain....................... 356/169

Primary Examiner—Ronald L. Wibert
Assistant Examiner—Steven Morrison
Attorney, Agent, or Firm—Browne, Beveridge, Degrandi & Kline

[57] ABSTRACT

Two pairs of specially shaped bar members are attached to either side of a specimen respectively in such a manner that pointers attached to the two bar members in each pair are caused to be relatively longitudinally displaced to an extent proportional to the specimen strain. The bar members are constrained so as to be capable of relative movement which takes place only in the direction of specimen strain. The two members of at least one pair thereof carry respective diffraction gratings through which a light source is arranged to direct a beam of light whereby to generate a moiré fringe pattern. A photoelectric cell is provided for receiving at least a part of the fringe pattern. The cell is thus successively subjected to a plurality of light and dark bands which results in a plurality of electrical pulses proportional in number to the change in the gauge length.

11 Claims, 4 Drawing Figures

EXTENSOMETERS

The present invention relates to extensometers, that is, to instruments for measuring strains in specimens of a material under test.

An object of the present invention is to provide an apparatus for determining the deformation properties of rigid materials, such as thermoplastics materials, and especially the deformation properties of solid materials having non-linear visco-elastic properties.

According to a first aspect of the invention, an extensometer comprises a carriage adapted to be mounted on a specimen under test so as to define a gauge length between two pairs of pointers carried by the carriage, at least one pair of diffraction gratings carried by respective members of the carriage said members being constrained so as to be capable of relative movement which takes place only in the direction of specimen strain and whose magnitude is proportional to changes in the gauge length, and an optical system including a light source arranged to direct a beam of light through said gratings whereby to generate a moiré fringe pattern, and a photoelectric light detector for receiving at least a part of said fringe pattern, the optical system being arranged such that its operation is substantially independent of movement of the carriage members due to specimen strain.

By this arrangement, when a specimen is engaged by the pointers and the gauge length is increased or decreased due to the subjection of the specimen to a tensile or compressive load respectively, the fringes in said pattern are displaced by an amount proportional to the change in the gauge length. The photoelectric cell, preferably a photodiode is thus successively subjected to a plurality of light and dark bands which results in a plurality of electrical pulses proportional in number to the change in the gauge length. These pulses can be recorded automatically, for example on a chart recorder or event timer.

Preferably, there are two pairs of said members whereby the specimen is gripped between four pointers to provide a symmetrical load on the specimen. Two pairs of gratings can then be provided to enable the strain on the two sides of the specimen to be determined.

The invention will be further described, by way of example, with reference to the accompanying drawings, in which.

Figure 1:
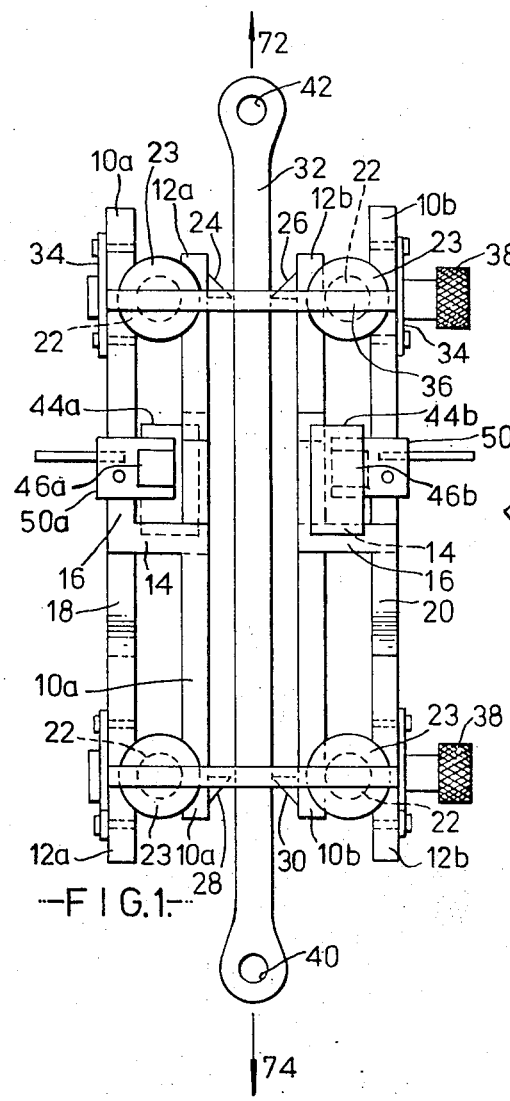
FIG. 1 is an end elevation of part of one embodiment of an extensometer constructed in accordance with the present invention, mounted on a specimen under test.
Figure 2:
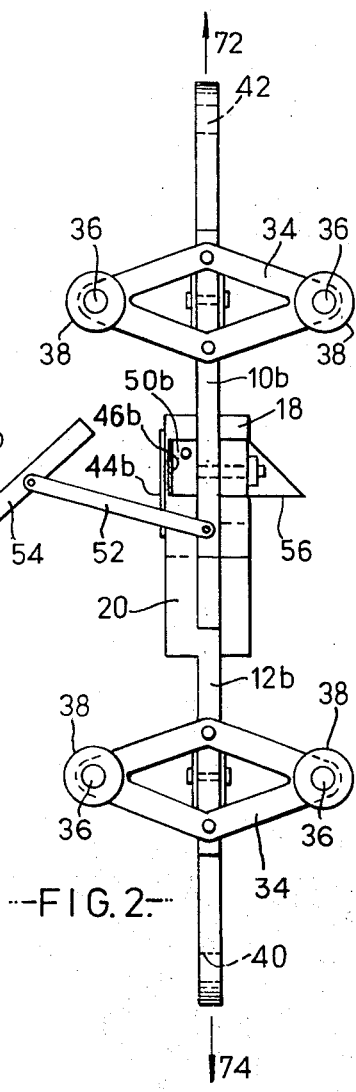
FIG. 2 is a side elevation of the extensometer of FIG. 1.

The extensometer of FIGS. 1 and 2 comprises two pairs of parallel bars 10a, 10b, 12a, 12b, the bars 10a, 10b having respective central stepped portions 14 and the bars 12a, 12b having respective central stepped portions 16. In addition, the bars 12a, 12b are also provided with respective, laterally offset portions 18, 20 which include the stepped portions 16. As can be seen most clearly in FIG. 2, the portions 18, 20 are offset in different directions so that the portion 18 lies in a plane rearwardly of the bars 10a, 10b and the portion 20 lies in a plane in front of the bars 10a, 10b. In this manner, the end portions of all four bars 10a, 10b, 12a, 12b can lie in a single plane although the bars in each pair (10a, 12a, 10b, 12b) are crossed at their central regions so that, at one end of each pair, the bars 10 a, 10b lie outside the bars 12a, 12b, but at the other end of the pairs, the positions are reversed.

A respective miniature roller bearing 22 is located between each pair of adjacent end portions of the bars 10a, 10b, 12a, 12b so that the bars in each pair are capable of relative longitudinal displacement. Each miniature roller bearing is flanged by spring loaded washers 23 at each end of that bearing so that the bars are constrained to move in a single plane by preventing relative rotation thereof. Each of the bars 10a, 10b, 12a and 12b carries an inwardly directed pointer at that one of its end portions which lies inwardly of an end portion of an adjacent one of the bars. Thus, the upper ends of the bars 12a, 12b as viewed in FIG. 1, carry pointers 24, 26 and the lower ends of the bars 10a, 10b carry pointers 28, 30. The bars 10a, 10b, 12a, 12b are mounted on a vertically disposed specimen 32 under test with the specimen engaged by the pointers 24, 26, 28 and 30. The bars are held in this position by means of two pairs of clamping arrangements located adjacent the upper and lower ends of the bars respectively. Each clamping arrangement comprises a pair of generally rhomboidal spring strips 34 attached to the outer ones of the bars 10a, 10b, 12a, 12b and interconnected at their projecting ends by means of tie-bars 36. A knurled knob 38 is provided on one screw-threaded end of each tie-bar 36 to enable the spring force holding the bars together to be adjusted, the spring strips being shaped and located such that the lines of action of the rollers and the pointers at the two ends of the bars are substantially coincident.

The specimen 32 is provided with apertures 40, 42 at its two ends whereby one end of the specimen 32 can be attached to a rigidly fixed member while the other end can be attached to a movable member through which a load can be transmitted to the specimen.

The vertical spacing between the upper and lower pointers provides a gauge length. In fact, there are effectively two "gauge lengths," one between the pointers 24 and 28 on one side of the specimen and another between the pointers 26 and 30 on the other side of the specimen. It will be observed that any change in the first mentioned gauge length will result in a change in the longitudinal spacing of the two bars 10a, 12a and any change in the second gauge length will result in a change in the longitudinal spacing of the two bars 10b, 12b. Clearly, when the specimen is subjected to a simple tensile load, the changes in the two gauge lengths will be substantially the same.

Such changes in the gauge length are detected by means of an optical system utilising the moiré fringe effect. When two identical transmission or diffraction gratings, each having alternate opaque and transparent elements of equal width, are placed face to face with their rulings relatively inclined at a small angle and viewed against a bright background, a pattern of interference fringes of varying light intensity is observed. These fringes are known as moiré fringes. If two such diffraction gratings are constrained to move relative to each other in a direction perpendicular yet coplanar with the rulings, then the moiré fringes will appear to move in a direction perpendicular to their length. The apparent movement of the moiré fringes is proportional to the movement of the grating and can be used to measure this latter movement.

In the extensometer of FIGS. 1 and 2, associated with the pair of bars 10a, 12a, is a pair of gratings 44a, 46a, and associated with the pair of bars 10b, 12b is a pair of gratings 44b, 46b. The gratings 44a and 44b are rigidly fixed to the bars 12a, 12b respectively and serve as reference gratings. The gratings 46a, 46b serving as index gratings, are carried by respective supports 50a, 50b which are rotatably mounted on the bars 10a, 10b, whereby the gratings 46a, 46b are rotatable in their own planes. The relative alignment of the pairs of gratings 44a, 46a and 44b, 46b can thus be set so that the lines of the rotatable grating in each pair are at a small angle to those of the fixed grating in that pair.

Attached to each of the bars 10a, 10b by supports 52 is a respective mirror 54, only one of which is shown in FIG. 2, the mirrors 54 being pivotably carried by the supports 52 so that their angular position relative to the gratings can be adjusted. Also attached to each of the bars 10a, 10b is a respective reflective prism 56 arranged to direct a light beam applied thereto, in a vertically upward direction from a respective light source (not shown), through the gratings and onto the mirrors 54. A respective arrangement of photodiodes (not shown) is located beneath each of the mirrors 54 at the bottom of a vertical tube so as to be capable of receiving at least a part of the reflected light beam from its associated mirror. Each photodiode arrangement is connected to an amplifying circuit and thence to a recording device such as a chart recorder, an event timer, or a digital counter.

Figure 3:
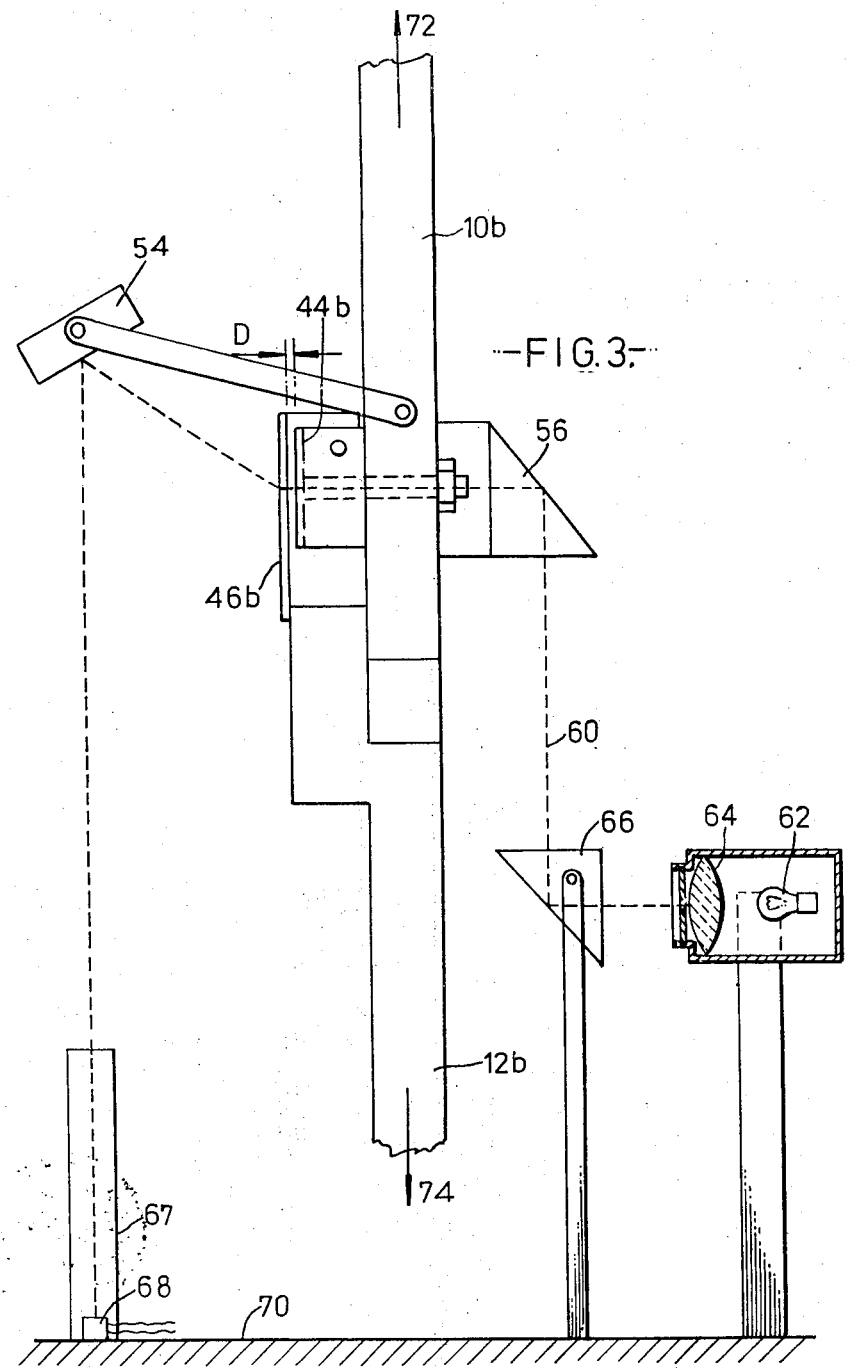
FIG. 3 is a diagrammatic side elevation of an extensometer in accordance with the invention illustrating the optical system of the instrument.
Figure 4:
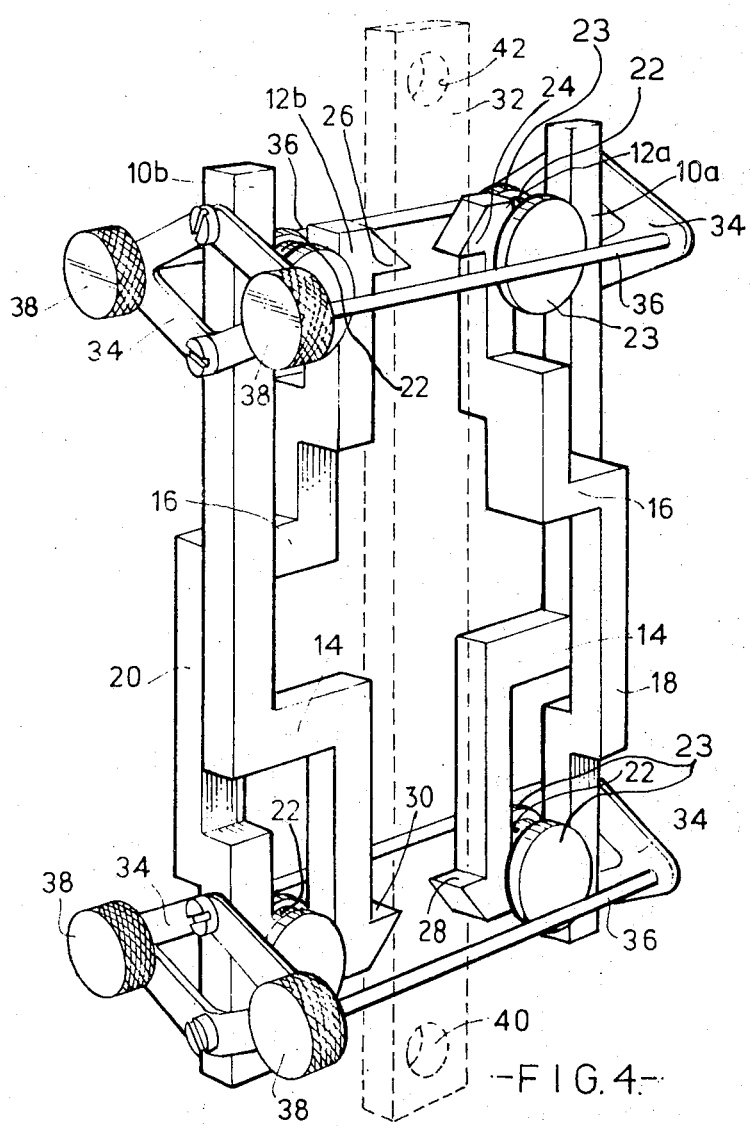
FIG. 4 is an isometric view of the extensometer mounted on a test specimen, with certain parts removed to more clearly illustrate other parts.

The operation of the optical system can be understood more clearly by reference to FIG. 3 which shows diagrammatically the arrangement of one half the extensometer of FIGS. 1 and 2. Thus, FIG. 3 shows the bars 10b, 12b having the index and reference gratings 44b, 46b mounted thereon respectively. The bar 10b also carries a mirror 54 and a reflective prism 56. A light beam, indicated by the dotted line 60 is generated by a light source 62 and directed onto the prism 56 via a collimating lens 64 and further reflective prism 66, referenced to a fixed supporting structure 70. The gratings 44b, 46b are mounted so that they are separated by a gap D of about 0.003 inches.

When the light beam passes through the two gratings several distinct bands of fringes corresponding to the zero, first, second, . . . etc. order fringe patterns are generated and "seen" by the mirror. The tube 67 having an arrangement of photodiodes 68 at the bottom thereof, is located on the fixed support 70 so as to receive the first order fringe pattern reflected by the mirror 54. This pattern comprises a series of light and dark bands. It can be seen that when the bars 10b, 12b are now moved longitudinally in the directions of the arrows 72, 74 respectively by virtue of an increase in the specimen length, and hence in the gauge length, the light and dark bands will move in direct relation to the movement of the bars.

It is to be noted that the prism 66 is referenced to the fixed supporting structure 70, whilst the prism 56 is referred to the moving carriage essentially comprising the bars 10a, 10b, 12a, 12b. Provided that the arrangement of photodiodes 68 is approximately vertically below the mirror 54, the axis of the optical system will always pass down the tube 67 irrespective of movement of the carriage members due to strain displacements. By this arrangement, the light source and the light sensitive receiver do not have to be carried by the moving carriage members so that the optical system is substantially independent of specimen strain. This has the advantages that the carriage can be light and there is no possibility of constraint being made on the movement of the carriage by the output leads of, for example, the photodiode arrangement 68. Furthermore only small area gratings are required since only relative grating movement in the direction of strain need be considered.

Pulses are generated by the cell as each light band passes, the pulses being either recorded on a chart or counted by a counter. The number of pulses recorded is directly proportional to the increase in the gauge length, i.e., to the extension undergone by the specimen, the constant of proportionality being determined solely by the line spacing on the gratings which is the same, accurately known amount for each grating. Thus, the instrument provides an "absolute" reading and no calibration is required.

All the parts of the instrument attached to the specimen are preferably constructed of ground flat stock steel so that high machining accuracy and dimensional stability can be attained. By providing an optical system on both sides of the specimen, differences in the strain experienced by each side of the specimen can be detected and an average strain calculated. However, only one pair of gratings may be provided if it is assumed that the aforementioned difference in strain on the two sides of the specimen is not significant.

In one embodiment, the arrangement of photodiodes can comprise two photodiodes connected in parallel at the bottom of the tube 67 and in opposition. The photodiodes are disposed such that when one is in a light field the other is in a dark field. This has the advantage of eliminating the effect of a changing background light level. Furthermore, the effective contrast is doubled.

In a further embodiment two or more photodiodes are provided in the tube 67 and coupled to a logic circuit adapted to indicate whether the gauge length is increasing or decreasing.

Conveniently the grating pitch is about 0.004 m.m.

Although the extensometer described above is for measuring extensions brought about in the specimen by tensile loads, with minor alterations, it could also be used for measuring contractions in length brought about by applying a compressive load to the specimen. It can also be used for retraction measurement (recovery) when a tensile load has been removed.

The above described extensometer has the advantages that it provides an absolute reading and can be light in weight (e.g. 100 grams). The long term signal stability is good because the output is inherently digital. Large displacements can be measured without loss of insensitivity. If increments of strain are recorded as a function of time a convenient format is provided for the automatic recording of long term creep and recovery.

I claim:
1. An extensometer comprising:
two pairs of elongate bars which are adapted to be symmetrically mounted on either side respectively of a specimen under test;

each bar in a pair including a first portion, the first portions of the bars in the pair being mutually parallel and co-planar, a second portion which lies parallel to and laterally spaced from the first portion of the other bar in that pair, said second portions of the bars in the pair also being mutually parallel and co-planar, and an intermediate cross-over portion connecting said first and second portions of the bar, the first and second portions of all four bars being co-planar;

a respective roller bearing located between and spacing apart said first and second portions of the pars in each pair;

a respective pointer means located adjacent the free end of each of said first portions of said bars for engaging the specimen whereby the two pointer means on the bars in each pair define therebetween a respective gauge length on the specimen;

a clamping means adapted to hold together said two pairs of bars with the specimen therebetween while allowing only relative longitudinal displacement between the two bars in each pair;

at least one pair of diffraction gratings carried by respective bars of at least one of said pairs of bars with their grating lines mutually inclined; and an optical system which includes a light source arranged for directing a beam of light through said gratings whereby to generate a Moire fringe pattern, and light detector means arranged to receive at least a part of said fringe pattern, the portions of the light source and light detector means being independent of displacement of the bars due to specimen strain.

2. An extensometer according to claim 1 in which one of said roller bearings is respectively located in the region of each of said four pointer means and said clamping means comprises a pair of spring-loaded clamping devices, the clamping forces applied by said two spring-loaded clamping devices being arranged to pass substantially through the line of action of two of said pointer means and the roller bearings adjacent thereto, and through the line of action of the other two pointer means and the rolling bearings adjacent thereto, respectively.

3. An extensometer according to claim 2 in which said spring-loaded clamping devices each comprises a pair of rhomboidal spring strips, one pair of opposite corners of each spring strip being attached to the second portion of a bar of one of said pairs and the other pair of opposite corners receiving respective clamping screws extending from corresponding corners of the other spring plate in the pair which is attached to the second portion of a bar in the other of said pairs of bars.

4. An extensometer according to claim 1 which is adapted to be mounted on a vertically oriented, elongate specimen with the two pointers associated with each pair of bars located one above the other to define two said gauge lengths on the specimen.

5. An extensometer according to claim 2 in which the two pairs of bars on opposite sides of the specimen each have a pair of diffraction gratings mounted thereon whereby the strain on both sides of the specimen can be monitored.

6. An extensometer according to claim 1 in which one of the diffraction gratings in each of said at least one pair of gratings is rigidly fixed to its supporting bar, whereas the other grating in the pair is angularly adjustable relative to its supporting bar and about an axis perpendicular to its plane.

7. An extensometer according to claim 1 in which said optical system further includes a first prism rigidly fixed to a reference surface, a second prism attached to one of said bars and arranged to direct a light beam, received from said light source by way of the first prism, through said pair of diffraction gratings, said one bar also carrying a mirror for directing part of the light emanating from the gratings to said photoelectric light detector.

8. An extensometer comprising:

two pairs of elongate bars which are adapted to be symmetrically mounted on either side respectively of a specimen under test;

each bar in a pair including a first portion, the first portions of the bars in the pair being mutually parallel and co-planar, a second portion which lies parallel to and laterally spaced from the first portion of the other bar in that pair, said second portions of the bars in the pair also being mutually parallel and co-planar, and an intermediate cross-over portion connecting said first and second portions of the bar, the first and second portions of all four bars being co-planar;

a respective roller bearing located between and spacing apart said first and second portions of the bars in each pair;

a respective pointer means located adjacent the free end of each of said first portions of said bars for engaging the specimen whereby the two pointer means on the bars in each pair define therebetween a respective gauge length on the specimen;

a clamping means adapted to hold together said two pairs of bars with the specimen therebetween while allowing only relative longitudinal displacement between the two bars in each pair;

a pair of diffraction gratings mounted in closely spaced, opposed parallel relation on respective bars of each of said pairs of bars with their grating lines mutually inclined, one of said diffraction gratings in each of said pair of gratings being rigidly mounted on its suppporting bar with the other grating in each of said pair being angularly adjustable relative to its supporting bar and about an axis perpendicular to its plane, and an optical system which includes a light source arranged for directing a beam of light through said pairs of gratings whereby to generate a Moire fringe pattern from each said pair of gratings, and light detector means arranged to receive at least a part of said fringe patterns, the position of the light source and said light detector means being independent of displacement of the bars due to specimen strain.

9. The extensometer according to claim 8 wherein said optical system further includes for each said pair of diffraction gratings a first prism rigidly fixed to a reference surface, a second prism attached to one of said bars and arranged to direct a light beam, received from said light source by way of the first prism, through said pair of diffraction gratings, said one bar also carrying a mirror for directing part of the light emanating from the grating to said photoelectric light detector.

10. The extensometer according to claim 9 wherein one of said roller bearings is respectively located in the region of each of said four pointer means and said clamping means comprises a pair of spring-loaded clamping devices, the clamping forces applied by said two spring-loaded clamping devices being arranged to pass substantially through the line of action of two of said pointer means and the roller bearings adjacent thereto, and through the line of action of the other two pointer means and the rolling bearings adjacent thereto, respectively, and wherein said spring-loaded clamping devices each comprises a pair of rhomboidal spring strips, one pair of opposite corners of each spring strip being attached to the second portion of a bar of one of said pairs and the other pair of opposite corners receiving respective clamping screws extending from corresponding orners of the other spring plate in the pair which is attached to the second portion of a bar in the other of said pairs of bars.

11. The extensometer according to claim 9 which is adapted to be mounted on a vertically oriented, elongate speciment with the two pointers associated with each pair of bars located one above the other to define two said gauge lengths on the specimen.

* * * * *